United States Patent
Gates et al.

(10) Patent No.: US 9,966,018 B2
(45) Date of Patent: May 8, 2018

(54) METHODS FOR DRIVING ELECTRO-OPTIC DISPLAYS

(71) Applicant: E INK CORPORATION, Billerica, MA (US)

(72) Inventors: Elizabeth Moran Gates, Somerville, MA (US); Karl R. Amundson, Cambridge, MA (US)

(73) Assignee: E Ink Corporation, Billerica, MA (US)

( * ) Notice: Subject to any disclaimer, the term of this patent is extended or adjusted under 35 U.S.C. 154(b) by 405 days.

(21) Appl. No.: 14/680,121

(22) Filed: Apr. 7, 2015

(65) Prior Publication Data

US 2015/0213765 A1    Jul. 30, 2015

Related U.S. Application Data

(60) Continuation of application No. 11/751,879, filed on May 22, 2007, now abandoned, which is a
(Continued)

(51) Int. Cl.
*G09G 3/34* (2006.01)
*H04N 1/46* (2006.01)

(52) U.S. Cl.
CPC .............. *G09G 3/344* (2013.01); *H04N 1/46* (2013.01); *G09G 2310/061* (2013.01); *G09G 2320/02* (2013.01); *G09G 2330/022* (2013.01)

(58) Field of Classification Search
CPC .. G02F 2001/1672–2001/1678; G02F 1/1334; G02F 1/167; G02F 9/372; B41J 3/4076; G02B 26/026
See application file for complete search history.

(56) References Cited

U.S. PATENT DOCUMENTS

| | | |
|---|---|---|
| 3,668,106 A | 6/1972 | Ota |
| 3,756,693 A | 9/1973 | Ota |

(Continued)

FOREIGN PATENT DOCUMENTS

| | | |
|---|---|---|
| DE | 25 23 763 | 12/1976 |
| EA | 1 536 271 | 6/2005 |

(Continued)

OTHER PUBLICATIONS

Rogers et al., "Paper-like electronic display: Large-area rubber-stamped plastic sheets of electronics and microencapsulated electrophoretic inks," (Apr. 24, 2001).*

(Continued)

*Primary Examiner* — Patrick Edouard
*Assistant Examiner* — Peijie Shen
(74) *Attorney, Agent, or Firm* — David J. Cole

(57) ABSTRACT

Methods are provided for of driving a bistable electro-optic display having at least first and second pixels separated by an inter-pixel gap. In one method, there is applied to the first pixel a drive pulse which drives the pixel to one extreme optical state, and there is applied to the second pixel, which is in this extreme optical state, a reinforcing pulse of the same polarity as the drive pulse. In a second method, a drive pulse applied to the first pixel drives that pixel away from one extreme optical state, and an inverse reinforcing pulse applied to the second pixel is of opposite polarity to the drive pulse. The drive methods reduce edge ghosting or blooming.

36 Claims, 3 Drawing Sheets

Related U.S. Application Data continuation-in-part of application No. 11/611,324, filed on Dec. 15, 2006, which is a division of application No. 10/249,973, filed on May 23, 2003, now Pat. No. 7,193,625.

(60) Provisional application No. 60/319,315, filed on Jun. 13, 2002, provisional application No. 60/319,321, filed on Jun. 18, 2002, provisional application No. 60/803,305, filed on May 26, 2006, provisional application No. 60/804,491, filed on Jun. 12, 2006.

(56) References Cited

U.S. PATENT DOCUMENTS

| | | | |
|---|---|---|---|
| 3,767,392 A | 10/1973 | Ota | |
| 3,792,308 A | 2/1974 | Ota | |
| 3,870,517 A | 3/1975 | Ota et al. | |
| 3,892,568 A | 7/1975 | Ota | |
| 3,972,040 A | 7/1976 | Hilsum et al. | |
| 4,041,481 A | 8/1977 | Sato | |
| 4,418,346 A | 11/1983 | Batchelder | |
| 4,430,648 A | 2/1984 | Togashi et al. | |
| 4,450,440 A | 5/1984 | White | |
| 4,741,604 A | 5/1988 | Kornfeld | |
| 4,746,917 A | 5/1988 | DiSanto et al. | |
| 4,833,464 A | 5/1989 | DiSanto et al. | |
| 4,873,516 A * | 10/1989 | Castleberry | G09G 3/3648 345/58 |
| 4,947,157 A | 8/1990 | DiSanto et al. | |
| 4,947,159 A | 8/1990 | DiSanto et al. | |
| 5,010,327 A | 4/1991 | Wakita et al. | |
| 5,066,946 A | 11/1991 | DiSanto et al. | |
| 5,122,783 A * | 6/1992 | Bassetti, Jr. | G09G 3/20 345/593 |
| 5,177,475 A | 1/1993 | Stephany et al. | |
| 5,223,115 A | 6/1993 | DiSanto et al. | |
| 5,247,290 A | 9/1993 | DiSanto et al. | |
| 5,254,981 A | 10/1993 | Disanto et al. | |
| 5,266,937 A | 11/1993 | DiSanto et al. | |
| 5,293,528 A | 3/1994 | DiSanto et al. | |
| 5,302,235 A | 4/1994 | DiSanto et al. | |
| 5,412,398 A | 5/1995 | DiSanto et al. | |
| 5,467,107 A | 11/1995 | DiSanto et al. | |
| 5,467,217 A | 11/1995 | Check, III | |
| 5,499,038 A | 3/1996 | DiSanto et al. | |
| 5,654,732 A * | 8/1997 | Katakura | G09G 3/3607 345/103 |
| 5,657,041 A * | 8/1997 | Choi | G09G 3/3622 345/94 |
| 5,684,501 A | 11/1997 | Knapp et al. | |
| 5,689,282 A | 11/1997 | Wolfs et al. | |
| 5,717,515 A | 2/1998 | Sheridon | |
| 5,739,801 A | 4/1998 | Sheridon | |
| 5,745,094 A | 4/1998 | Gordon, II et al. | |
| 5,760,761 A | 6/1998 | Sheridon | |
| 5,777,782 A | 7/1998 | Sheridon | |
| 5,808,783 A | 9/1998 | Crowley | |
| 5,856,815 A * | 1/1999 | Mochizuki | G09G 3/3629 345/89 |
| 5,872,552 A | 2/1999 | Gordon, II et al. | |
| 5,892,504 A | 4/1999 | Knapp | |
| 5,896,117 A | 4/1999 | Moon | |
| 5,900,856 A * | 5/1999 | Iino | G09G 3/3611 345/100 |
| 5,930,026 A | 7/1999 | Jacobson et al. | |
| 5,933,203 A | 8/1999 | Wu et al. | |
| 5,961,804 A | 10/1999 | Jacobson et al. | |
| 5,963,456 A | 10/1999 | Klein et al. | |
| 5,978,052 A | 11/1999 | Ilcisin et al. | |
| 6,002,384 A | 12/1999 | Tamai et al. | |
| 6,017,584 A | 1/2000 | Albert et al. | |
| 6,034,807 A | 3/2000 | Little et al. | |
| 6,046,716 A * | 4/2000 | McKnight | G09G 3/2011 345/208 |
| 6,054,071 A | 4/2000 | Mikkelsen, Jr. | |
| 6,055,091 A | 4/2000 | Sheridon et al. | |
| 6,055,180 A | 4/2000 | Gudesen et al. | |
| 6,057,814 A | 5/2000 | Kalt | |
| 6,064,410 A | 5/2000 | Wen et al. | |
| 6,067,185 A | 5/2000 | Albert et al. | |
| 6,081,285 A | 6/2000 | Wen et al. | |
| 6,097,531 A | 8/2000 | Sheridon | |
| 6,118,426 A | 9/2000 | Albert et al. | |
| 6,120,588 A | 9/2000 | Jacobson | |
| 6,120,839 A | 9/2000 | Comiskey et al. | |
| 6,124,851 A | 9/2000 | Jacobson | |
| 6,128,124 A | 10/2000 | Silverman | |
| 6,130,773 A | 10/2000 | Jacobson et al. | |
| 6,130,774 A | 10/2000 | Albert et al. | |
| 6,137,467 A | 10/2000 | Sheridon et al. | |
| 6,144,361 A | 11/2000 | Gordon, II et al. | |
| 6,147,791 A | 11/2000 | Sheridon | |
| 6,154,190 A | 11/2000 | Yang et al. | |
| 6,172,798 B1 | 1/2001 | Albert et al. | |
| 6,177,921 B1 | 1/2001 | Comiskey et al. | |
| 6,184,856 B1 | 2/2001 | Gordon, II et al. | |
| 6,211,998 B1 | 4/2001 | Sheridon | |
| 6,225,971 B1 | 5/2001 | Gordon, II et al. | |
| 6,232,950 B1 | 5/2001 | Albert et al. | |
| 6,236,385 B1 | 5/2001 | Nomura et al. | |
| 6,239,896 B1 | 5/2001 | Ikeda | |
| 6,241,921 B1 | 6/2001 | Jacobson et al. | |
| 6,249,271 B1 | 6/2001 | Albert et al. | |
| 6,252,564 B1 | 6/2001 | Albert et al. | |
| 6,262,706 B1 | 7/2001 | Albert et al. | |
| 6,262,833 B1 | 7/2001 | Loxley et al. | |
| 6,271,823 B1 | 8/2001 | Gordon, II et al. | |
| 6,300,932 B1 | 10/2001 | Albert | |
| 6,301,038 B1 | 10/2001 | Fitzmaurice et al. | |
| 6,312,304 B1 | 11/2001 | Duthaler et al. | |
| 6,312,971 B1 | 11/2001 | Amundson et al. | |
| 6,320,565 B1 | 11/2001 | Albu et al. | |
| 6,323,989 B1 | 11/2001 | Jacobson et al. | |
| 6,327,072 B1 | 12/2001 | Comiskey et al. | |
| 6,330,054 B1 | 12/2001 | Ikami | |
| 6,348,908 B1 | 2/2002 | Richley et al. | |
| 6,359,605 B1 | 3/2002 | Knapp et al. | |
| 6,373,461 B1 | 4/2002 | Hasegawa et al. | |
| 6,376,828 B1 | 4/2002 | Comiskey | |
| 6,377,387 B1 | 4/2002 | Duthaler et al. | |
| 6,392,785 B1 | 5/2002 | Albert et al. | |
| 6,392,786 B1 | 5/2002 | Albert | |
| 6,407,763 B1 | 6/2002 | Yamaguchi et al. | |
| 6,413,790 B1 | 7/2002 | Duthaler et al. | |
| 6,421,033 B1 | 7/2002 | Williams et al. | |
| 6,422,687 B1 | 7/2002 | Jacobson | |
| 6,445,374 B2 | 9/2002 | Albert et al. | |
| 6,445,489 B1 | 9/2002 | Jacobson et al. | |
| 6,459,418 B1 | 10/2002 | Comiskey et al. | |
| 6,462,837 B1 | 10/2002 | Tone | |
| 6,473,072 B1 | 10/2002 | Comiskey et al. | |
| 6,480,182 B2 | 11/2002 | Turner et al. | |
| 6,498,114 B1 | 12/2002 | Amundson et al. | |
| 6,504,524 B1 | 1/2003 | Gates et al. | |
| 6,506,438 B2 | 1/2003 | Duthaler et al. | |
| 6,512,354 B2 | 1/2003 | Jacobson et al. | |
| 6,515,649 B1 | 2/2003 | Albert et al. | |
| 6,518,949 B2 | 2/2003 | Drzaic | |
| 6,521,489 B2 | 2/2003 | Duthaler et al. | |
| 6,531,997 B1 | 3/2003 | Gates et al. | |
| 6,535,197 B1 | 3/2003 | Comiskey et al. | |
| 6,538,801 B2 | 3/2003 | Jacobson et al. | |
| 6,545,291 B1 | 4/2003 | Amundson et al. | |
| 6,580,545 B2 | 6/2003 | Morrison et al. | |
| 6,639,578 B1 | 10/2003 | Comiskey et al. | |
| 6,652,075 B2 | 11/2003 | Jacobson | |
| 6,657,772 B2 | 12/2003 | Loxley | |
| 6,664,944 B1 | 12/2003 | Albert et al. | |
| D485,294 S | 1/2004 | Albert | |
| 6,672,921 B1 | 1/2004 | Liang et al. | |
| 6,680,725 B1 | 1/2004 | Jacobson | |
| 6,683,333 B2 | 1/2004 | Kazlas et al. | |
| 6,693,620 B1 | 2/2004 | Herb et al. | |

(56) References Cited

U.S. PATENT DOCUMENTS

| | | |
|---|---|---|
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Comiskey et al. |
| 6,727,881 B1 | 4/2004 | Albert et al. |
| 6,738,050 B2 | 5/2004 | Comiskey et al. |
| 6,750,473 B2 | 6/2004 | Amundson et al. |
| 6,753,999 B2 | 6/2004 | Zehner et al. |
| 6,788,449 B2 | 9/2004 | Liang et al. |
| 6,816,147 B2 | 11/2004 | Albert |
| 6,819,471 B2 | 11/2004 | Amundson et al. |
| 6,822,782 B2 | 11/2004 | Honeyman et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert et al. |
| 6,842,165 B2 * | 1/2005 | Inoue ............... G02F 1/167 345/107 |
| 6,842,167 B2 | 1/2005 | Albert et al. |
| 6,842,279 B2 | 1/2005 | Amundson |
| 6,842,657 B1 | 1/2005 | Drzaic et al. |
| 6,864,875 B2 | 3/2005 | Drzaic |
| 6,865,010 B2 | 3/2005 | Duthaler et al. |
| 6,866,760 B2 | 3/2005 | Paolini, Jr. et al. |
| 6,870,657 B1 | 3/2005 | Fitzmaurice et al. |
| 6,870,661 B2 | 3/2005 | Pullen et al. |
| 6,900,851 B2 | 5/2005 | Morrison et al. |
| 6,914,713 B2 * | 7/2005 | Chung ............... G02F 1/167 345/107 |
| 6,922,276 B2 | 7/2005 | Zhang et al. |
| 6,950,220 B2 | 9/2005 | Abramson et al. |
| 6,958,848 B2 | 10/2005 | Cao et al. |
| 6,967,640 B2 | 11/2005 | Albert et al. |
| 6,980,196 B1 | 12/2005 | Turner et al. |
| 6,982,178 B2 | 1/2006 | LeCain et al. |
| 6,987,603 B2 | 1/2006 | Paolini, Jr. et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates et al. |
| 7,038,655 B2 | 5/2006 | Herb et al. |
| 7,061,663 B2 | 6/2006 | Cao et al. |
| 7,071,913 B2 | 7/2006 | Albert et al. |
| 7,075,502 B1 | 7/2006 | Drzaic et al. |
| 7,075,703 B2 | 7/2006 | O'Neil et al. |
| 7,079,305 B2 | 7/2006 | Paolini, Jr. et al. |
| 7,106,297 B2 * | 9/2006 | Shannon ............ G02F 1/167 345/107 |
| 7,126,577 B2 * | 10/2006 | Zhou ................. G09G 3/34 345/107 |
| 7,126,743 B2 | 10/2006 | Johnson et al. |
| 7,193,625 B2 * | 3/2007 | Danner ............. G02F 1/167 345/214 |
| 7,423,800 B2 * | 9/2008 | Ito ..................... G02F 1/167 359/245 |
| 7,550,308 B2 * | 6/2009 | Yoshinaga ......... G02F 1/167 257/59 |
| 7,872,633 B2 * | 1/2011 | Zhou ................. G09G 3/344 345/107 |
| 7,999,832 B2 * | 8/2011 | Burberry ........... G02F 1/133707 345/691 |
| 8,068,089 B2 * | 11/2011 | Matsuda ............ G02F 1/167 345/107 |
| 2001/0026260 A1 | 10/2001 | Yoneda et al. |
| 2002/0005832 A1 | 1/2002 | Katase |
| 2002/0033784 A1 | 3/2002 | Machida et al. |
| 2002/0033793 A1 | 3/2002 | Machida et al. |
| 2002/0060321 A1 | 5/2002 | Kazlas et al. |
| 2002/0090980 A1 | 7/2002 | Wilcox et al. |
| 2002/0113770 A1 | 8/2002 | Jacobson et al. |
| 2002/0180687 A1 | 12/2002 | Webber |
| 2002/0196207 A1 | 12/2002 | Machida et al. |
| 2002/0196219 A1 | 12/2002 | Matsunaga et al. |
| 2003/0011560 A1 | 1/2003 | Albert et al. |
| 2003/0058223 A1 | 3/2003 | Tracy et al. |
| 2003/0063076 A1 | 4/2003 | Machida et al. |
| 2003/0102858 A1 | 6/2003 | Jacobson et al. |
| 2003/0151702 A1 | 8/2003 | Morrison et al. |
| 2003/0214695 A1 | 11/2003 | Abramson et al. |
| 2003/0222315 A1 | 12/2003 | Amundson et al. |
| 2004/0014265 A1 | 1/2004 | Kazlas et al. |
| 2004/0051934 A1 | 3/2004 | Machida et al. |
| 2004/0075634 A1 | 4/2004 | Gates |
| 2004/0094422 A1 | 5/2004 | Pullen et al. |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0120024 A1 | 6/2004 | Chen et al. |
| 2004/0136048 A1 | 7/2004 | Arango et al. |
| 2004/0155857 A1 | 8/2004 | Duthaler et al. |
| 2004/0180476 A1 | 9/2004 | Kazlas et al. |
| 2004/0183759 A1 | 9/2004 | Stevenson et al. |
| 2004/0190114 A1 | 9/2004 | Jacobson et al. |
| 2004/0190115 A1 | 9/2004 | Liang et al. |
| 2004/0196215 A1 | 10/2004 | Duthaler et al. |
| 2004/0226820 A1 | 11/2004 | Webber et al. |
| 2004/0239587 A1 | 12/2004 | Murata et al. |
| 2004/0239614 A1 | 12/2004 | Amundson et al. |
| 2004/0246562 A1 | 12/2004 | Chung et al. |
| 2004/0252360 A1 | 12/2004 | Webber et al. |
| 2004/0257635 A1 | 12/2004 | Paolini, Jr. et al. |
| 2004/0263947 A1 | 12/2004 | Drzaic et al. |
| 2005/0001810 A1 | 1/2005 | Yakushiji et al. |
| 2005/0001812 A1 | 1/2005 | Amundson et al. |
| 2005/0007336 A1 | 1/2005 | Albert et al. |
| 2005/0012980 A1 | 1/2005 | Wilcox et al. |
| 2005/0017944 A1 | 1/2005 | Albert |
| 2005/0018273 A1 | 1/2005 | Honeyman et al. |
| 2005/0024353 A1 | 2/2005 | Amundson et al. |
| 2005/0035941 A1 | 2/2005 | Albert et al. |
| 2005/0062714 A1 | 3/2005 | Zehner et al. |
| 2005/0067656 A1 | 3/2005 | Denis et al. |
| 2005/0078099 A1 | 4/2005 | Amundson et al. |
| 2005/0104844 A1 | 5/2005 | Nakai et al. |
| 2005/0105159 A1 | 5/2005 | Paolini, Jr. et al. |
| 2005/0105162 A1 | 5/2005 | Paolini, Jr. et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0122564 A1 | 6/2005 | Zehner et al. |
| 2005/0122565 A1 | 6/2005 | Doshi et al. |
| 2005/0134554 A1 | 6/2005 | Albert et al. |
| 2005/0146774 A1 | 7/2005 | LeCain et al. |
| 2005/0151709 A1 | 7/2005 | Jacobson et al. |
| 2005/0152018 A1 | 7/2005 | Abramson et al. |
| 2005/0152022 A1 | 7/2005 | Honeyman et al. |
| 2005/0156340 A1 | 7/2005 | Valianatos et al. |
| 2005/0168799 A1 | 8/2005 | Whitesides et al. |
| 2005/0168801 A1 | 8/2005 | O'Neil et al. |
| 2005/0179642 A1 | 8/2005 | Wilcox et al. |
| 2005/0190137 A1 | 9/2005 | Duthaler et al. |
| 2005/0212747 A1 | 9/2005 | Amundson |
| 2005/0213191 A1 | 9/2005 | Whitesides et al. |
| 2005/0219184 A1 | 10/2005 | Zehner et al. |
| 2005/0253777 A1 | 11/2005 | Zehner et al. |
| 2005/0270261 A1 | 12/2005 | Danner et al. |
| 2005/0280626 A1 | 12/2005 | Amundson et al. |
| 2006/0007527 A1 | 1/2006 | Paolini, Jr. et al. |
| 2006/0007528 A1 | 1/2006 | Cao et al. |
| 2006/0023296 A1 | 2/2006 | Whitesides et al. |
| 2006/0024437 A1 | 2/2006 | Pullen et al. |
| 2006/0038772 A1 | 2/2006 | Amundson et al. |
| 2006/0139308 A1 | 6/2006 | Jacobson et al. |
| 2006/0139310 A1 | 6/2006 | Zehner et al. |
| 2006/0139311 A1 | 6/2006 | Zehner et al. |
| 2006/0176267 A1 | 8/2006 | Honeyman et al. |
| 2006/0181492 A1 | 8/2006 | Gates et al. |
| 2006/0181504 A1 | 8/2006 | Kawai |

(56) References Cited

U.S. PATENT DOCUMENTS

| | | | |
|---|---|---|---|
| 2006/0194619 | A1 | 8/2006 | Wilcox et al. |
| 2006/0197737 | A1 | 9/2006 | Baucom et al. |
| 2006/0197738 | A1 | 9/2006 | Kawai |
| 2006/0202949 | A1 | 9/2006 | Danner et al. |
| 2006/0223282 | A1 | 10/2006 | Amundson et al. |
| 2006/0232531 | A1 | 10/2006 | Amundson et al. |
| 2006/0262060 | A1 | 11/2006 | Amundson |
| 2006/0279527 | A1 | 12/2006 | Zehner et al. |
| 2006/0291034 | A1 | 12/2006 | Patry et al. |
| 2007/0035532 | A1 | 2/2007 | Amundson et al. |
| 2007/0035808 | A1 | 2/2007 | Amundson et al. |
| 2007/0126693 | A1 | 6/2007 | Johnson et al. |
| 2007/0212022 | A1* | 9/2007 | Zhou ................... G09G 3/344 386/344 |

FOREIGN PATENT DOCUMENTS

| | | |
|---|---|---|
| EP | 1 099 207 B1 | 3/2002 |
| EP | 1 145 072 B1 | 5/2003 |
| EP | 1 462 847 | 9/2004 |
| EP | 1 482 354 | 12/2004 |
| EP | 1 484 635 | 12/2004 |
| EP | 1 500 971 A1 | 1/2005 |
| EP | 1 501 194 A1 | 1/2005 |
| EP | 1 542 067 | 6/2005 |
| EP | 1 577 702 | 9/2005 |
| EP | 1 577 703 | 9/2005 |
| EP | 1 598 694 | 11/2005 |
| JP | 03-091722 A | 4/1991 |
| JP | 03-096925 A | 4/1991 |
| JP | 05-173194 A | 7/1993 |
| JP | 06-233131 A | 8/1994 |
| JP | 09-016116 A | 1/1997 |
| JP | 09-185087 A | 7/1997 |
| JP | 09-230391 A | 9/1997 |
| JP | 11-113019 A | 4/1999 |
| WO | WO 99/10870 | 3/1999 |
| WO | WO 00/36560 | 6/2000 |
| WO | WO 00/38000 | 6/2000 |
| WO | WO 00/67110 | 11/2000 |
| WO | WO 01/07961 | 2/2001 |
| WO | WO 2004/001498 | 12/2003 |
| WO | WO 2004/079442 | 9/2004 |
| WO | WO 2004/090626 | 10/2004 |
| WO | WO 2004/107031 | 12/2004 |
| WO | WO 2005/034074 | 4/2005 |
| WO | WO 2005/050607 | 6/2005 |
| WO | WO 2005/052905 | 6/2005 |
| WO | WO 2005/094519 | 10/2005 |
| WO | WO 2005/096259 | 10/2005 |
| WO | WO 2006/013506 | 2/2006 |

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Antia, M., "Switchable Reflections Make Electronic Ink", Science, 285, 658 (1999).

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Bouchard, A. et al., "High-Resolution Microencapsulated Electrophoretic Display on Silicon", SID 04 Digest, 651 (2004).

Caillot, E. et al. "Active Matrix Electrophoretic Information Display for High Performance Mobile Devices", IDMC Proceedings (2003).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Danner, G.M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Gates, H. et al., "A5 Sized Electronic Paper Display for Document Viewing", SID 05 Digest, (2005).

Hayes, R.A., et al., "Video-Speed Electronic Paper Based on Electrowetting", Nature, vol. 425, Sep. 25, pp. 383-385 (2003).

Henzen, A. et al., "An Electronic Ink Low Latency Drawing Tablet", SID 04 Digest, 1070 (2004).

Henzen, A. et al., "Development of Active Matrix Electronic Ink Displays for Handheld Devices", SID 03 Digest, 176, (2003).

Henzen, A. et al., "Development of Active Matrix Electronic Ink Displays for Smart Handheld Applications", IDW'02, 227 (2002).

Hunt, R.W.G., "Measuring Color", 3d. Edn, Fountain Press (ISBN 0 86343 387 1), p. 63 (1998).

Jacobson, J., et al., "The last book", IBM Systems J., 36, 457 (1997).

Jo, G-R, et al., "Toner Display Based on Particle Movements", Chem. Mater, 14, 664 (2002).

Johnson, M. et al., "High Quality Images on Electronic Paper Displays", SID 05 Digest, 1666 (2005).

Kazlas, P. et al., "Card-size Active-matrix Electronic Ink Display", Eurodisplay 2002, 259 (2002).

Kazlas, P., et al., "12.1" SVGA Microencapsulated Electrophoretic Active Matrix Display for Information Applicances", SID 01 Digest, 152 (Jun. 2001).

Kitamura, T., et al., "Electrical toner movement for electronic paper-like display", Asia Display/IDW'01, p. 1517, Paper HCS1-1 (2001).

Mossman, M.A., et al., "A New Reflective Color Display Technique Based on Total Internal Reflection and Substractive Color Filtering", SID 01 Digest, 1054 (2001).

O'Regan, B. et al., "A Low Cost, High-efficiency Solar Cell Based on Dye-sensitized colloidal TiO2 Films", Nature, vol. 353, Oct. 24, 1991, 773-740.

Pitt, M.G., et al., "Power Consumption of Microencapsulated Electrophoretic Displays for Smart Handheld Applications", SID 02 Digest, 1378 (2002).

Poor, A., "Feed forward makes LCDs Faster", available at "http://www.extremetech.com/article2/0,3973,10085,00.asp".

Shiffman, R.R., et al., "An Electrophoretic Image Display with Internal NMOS Address Logic and Display Drivers," Proceedings of the SID, 1984, vol. 25, 105 (1984).

Singer, B., et al., "An X-Y Addressable Electrophoretic Display," Proceedings of the SID, 18, 255 (1977).

Webber, R., "Image Stability in Active-Matrix Microencapsulated Electrophoretic Displays", SID 02 Digest, 126 (2002).

Whitesides, T. et al., "Towards Video-rate Microencapsulated Dual-Particle Electrophoretic Displays", SID 04 Digest, 133 (2004).

Wood, D., "An Electrochromic Renaissance?" Information Display, 18(3), 24 (Mar. 2002).

Yamaguchi, Y., et al., "Toner display using insulative particles charged triboelectrically", Asia Display/IDW'01, p. 1729, Paper AMD4-4 (2001).

Zehner, R. et al., "Drive Waveforms for Active Matrix Electrophoretic Displays", SID 03 Digest, 842 (2003).

* cited by examiner

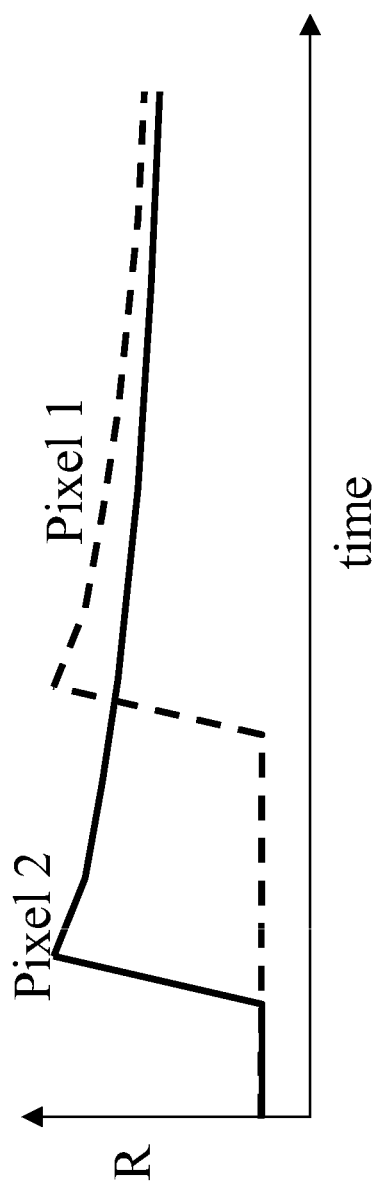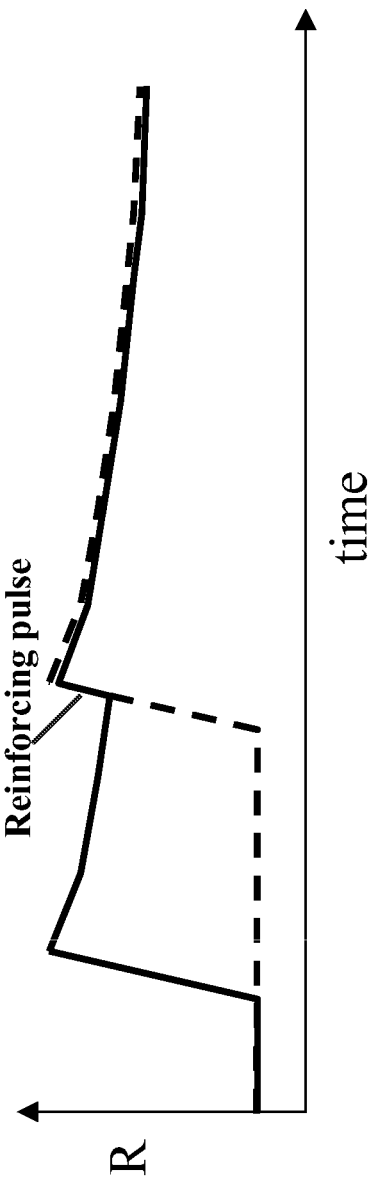

METHODS FOR DRIVING ELECTRO-OPTIC DISPLAYS

REFERENCE TO RELATED APPLICATIONS

This application is a continuation of application Ser. No. 11/751,879, filed May 22, 2007 (Publication No. 2008/0024482, now abandoned), which claims benefit of Application Ser. No. 60/803,305, filed May 26, 2006, and of Application Ser. No. 60/804,491, filed Jun. 12, 2006.

The aforementioned application Ser. No. 11/751,879 is a continuation-in-part of application Ser. No. 11/611,324, filed Dec. 15, 2006 (Publication No. 2007/0091418, now abandoned), which is itself a divisional of application Ser. No. 10/249,973, filed May 23, 2003 (now U.S. Pat. No. 7,193,625, issued Mar. 20, 2007), which claims benefit of Application Ser. No. 60/319,315, filed Jun. 13, 2002 and Application Ser. No. 60/319,321, filed Jun. 18, 2002.

This application is also related to application Ser. No. 10/065,795, filed Nov. 20, 2002 (now U.S. Pat. No. 7,012,600, issued Mar. 14, 2006), which is itself is a continuation-in-part of application Ser. No. 09/561,424, filed Apr. 28, 2000 (now U.S. Pat. No. 6,531,997, issued Mar. 11, 2003), which is itself a continuation-in-part of application Ser. No. 09/520,743, filed Mar. 8, 2000 (now U.S. Pat. No. 6,504,524, issued Jan. 7, 2003). The aforementioned application Ser. No. 10/065,795 also claims priority from the following Provisional Applications: (a) Ser. No. 60/319,007, filed Nov. 20, 2001; (b) Ser. No. 60/319,010, filed Nov. 21, 2001; (c) Ser. No. 60/319,034, filed Dec. 18, 2001; (d) Ser. No. 60/319,037, filed Dec. 20, 2001; and (e) Ser. No. 60/319,040, filed Dec. 21, 2001. This application is also related to application Ser. No. 10/063,236, filed Apr. 2, 2002 (now U.S. Pat. No. 7,170,670, issued Jan. 30, 2007), and to application Ser. No. 10/879,335, filed Jun. 29, 2004 (Publication No. 2005/0024353, now U.S. Pat. No. 7,528,822 issued May 5, 2009). The entire contents of the aforementioned applications, and of all U.S. patents and published applications mentioned below, are herein incorporated by reference.

BACKGROUND OF INVENTION

This invention relates to methods for driving electro-optic displays, particularly bistable electro-optic displays, and to displays using such methods. The methods and displays of the present invention are especially, though not exclusively, intended for use in driving bistable electrophoretic displays.

The term "electro-optic" as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned the transition between the two extreme states may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed to applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (25 Sep. 2003). It is shown in copending application Ser. No. 10/711,802, filed Oct. 6, 2004 (Publication No. 2005/0151709), that such electro-wetting displays can be made bistable.

Another type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication No. 2005/0001810; European Patent Applications 1,462,847; 1,482,354; 1,484,635; 1,500,971; 1,501,194; 1,536,271; 1,542,067; 1,577,702; 1,577,703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961, 804; 6,017,584; 6,067,185; 6,118,426; 6,120,588; 6,120, 839; 6,124,851; 6,130,773; 6,130,774; 6,172,798; 6,177, 921; 6,232,950; 6,249,271; 6,252,564; 6,262,706; 6,262, 833; 6,300,932; 6,312,304; 6,312,971; 6,323,989; 6,327, 072; 6,376,828; 6,377,387; 6,392,785; 6,392,786; 6,413, 790; 6,422,687; 6,445,374; 6,445,489; 6,459,418; 6,473, 072; 6,480,182; 6,498,114; 6,504,524; 6,506,438; 6,512, 354; 6,515,649; 6,518,949; 6,521,489; 6,531,997; 6,535, 197; 6,538,801; 6,545,291; 6,580,545; 6,639,578; 6,652, 075; 6,657,772; 6,664,944; 6,680,725; 6,683,333; 6,704, 133; 6,710,540; 6,721,083; 6,724,519; 6,727,881; 6,738, 050; 6,750,473; 6,753,999; 6,816,147; 6,819,471; 6,822, 782; 6,825,068; 6,825,829; 6,825,970; 6,831,769; 6,839, 158; 6,842,167; 6,842,279; 6,842,657; 6,864,875; 6,865, 010; 6,866,760; 6,870,661; 6,900,851; 6,922,276; 6,950, 200; 6,958,848; 6,967,640; 6,982,178; 6,987,603; 6,995, 550; 7,002,728; 7,012,600; 7,012,735; 7,023,420; 7,030, 412; 7,030,854; 7,034,783; 7,038,655; 7,061,663; 7,071, 913; 7,075,502; 7,075,703; 7,079,305; 7,106,296; 7,109, 968; 7,110,163; 7,110,164; 7,116,318; 7,116,466; 7,119,759; 7,119,772; 7,148,128; 7,167,155; 7,170,670; 7,173,752; 7,176,880; and 7,180,649; and U.S. Patent Applications Publication Nos. 2002/0060321; 2002/0090980; 2003/ 0011560; 2003/0102858; 2003/0151702; 2003/0222315; 2004/0014265; 2004/0075634; 2004/0094422; 2004/ 0105036; 2004/0112750; 2004/0119681; 2004/0136048; 2004/0155857; 2004/0180476; 2004/0190114; 2004/ 0196215; 2004/0226820; 2004/0257635; 2004/0263947; 2005/0000813; 2005/0007336; 2005/0012980; 2005/ 0017944; 2005/0018273; 2005/0024353; 2005/0062714; 2005/0067656; 2005/0078099; 2005/0099672; 2005/ 0122284; 2005/0122306; 2005/0122563; 2005/0134554; 2005/0146774; 2005/0151709; 2005/0152018; 2005/ 0152022; 2005/0156340; 2005/0168799; 2005/0179642; 2005/0190137; 2005/0212747; 2005/0213191; 2005/ 0219184; 2005/0253777; 2005/0270261; 2005/0280626; 2006/0007527; 2006/0024437; 2006/0038772; 2006/ 0139308; 2006/0139310; 2006/0139311; 2006/0176267; 2006/0181492; 2006/0181504; 2006/0194619; 2006/ 0197736; 2006/0197737; 2006/0197738; 2006/0198014; 2006/0202949; and 2006/0209388; and International Applications Publication Nos. WO 00/38000; WO 00/36560; WO 00/67110; and WO 01/07961; and European Patents Nos. 1,099,207 B1; and 1,145,072 B1.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat.

Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See US Patent Publication Number 2004/0226820); and other similar techniques.) Thus, the resulting display can be flexible. Further, because the display medium can be printed (using a variety of methods), the display itself can be made inexpensively.

The bistable or multi-stable behavior of particle-based electrophoretic displays, and other electro-optic displays displaying similar behavior, is in marked contrast to that of conventional liquid crystal ("LC") displays. Twisted nematic liquid crystals act are not bi- or multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, the gray level of a pixel of an LC display is not sensitive to the polarity of the electric field, only to its magnitude, and indeed for technical reasons commercial LC displays usually reverse the polarity of the driving field at frequent intervals. In contrast, bistable electro-optic displays act, to a first approximation, as impulse transducers, so that the final state of a pixel depends not only upon the electric field applied and the time for which this field is applied, but also upon the state of the pixel prior to the application of the electric field.

Although as already indicated, electrophoretic and some other electro-optic displays exhibit bistability, this bistability is not unlimited, and images on the display slowly fade with time, so that if an image is to be maintained for extended periods, the image may have to be refreshed periodically, so as to restore the image to the optical state which it has when first written.

However, such refreshing of the image may give rise to its own problems. As discussed in the aforementioned U.S. Pat. Nos. 6,531,997 and 6,504,524, problems may be encountered, and the working lifetime of a display reduced, if the method used to drive the display does not result in zero, or near zero, net time-averaged applied electric field across the electro-optic medium. A drive method which does result in zero net time-averaged applied electric field across the electro-optic medium is conveniently referred to a "direct current balanced" or "DC balanced" drive method. If an image is to be maintained for extended periods by applying refreshing pulses, these pulses need to be of the same polarity as the addressing pulse originally used to drive the relevant pixel of the display to the optical state being maintained, which results in a DC imbalanced drive scheme.

The aforementioned 2005/0270261 describes how images on bistable electro-optic displays can be refreshed while reducing the deleterious effects associated with DC imbalanced drive schemes, if the refreshing is effected with short pulses. This published application describes a so-called "refresh pulse" method for addressing a bistable electro-optic display having at least one pixel, the method comprising:

applying an addressing pulse to drive the pixel to a first optical state;

leaving the pixel undriven for a period of time, thereby permitting the pixel to assume a second optical state different from the first optical state; and applying to the pixel a refresh pulse which substantially restores the pixel to the first optical state, the refresh pulse being short relative to the addressing pulse.

In this refresh pulse method, the refresh pulse will typically have an impulse not greater than about 20 percent of the impulse of the addressing pulse, desirably not greater than about 10 percent of this impulse, and preferably not greater than about 5 percent of this impulse. Typically the difference between the first and second optical states does not exceed about 1 unit of L* (where L* has the usual CIE definition:

$$L^* = 116(R/R_0)^{1/3} - 16,$$

where R is the reflectance and $R_0$ is a standard reflectance value); desirably this difference does not exceed about 0.5 unit of L*, and preferably does not exceed about 0.2 unit of L*. A plurality of refresh pulses may be applied to the pixel at regular intervals.

This refresh pulse method does allow refreshing of images on bistable electro-optic displays, thus improving the appearance of the images, but necessarily introduces some DC imbalance. The aforementioned 2005/0270261 also describes various methods for reducing the DC imbalance produced.

The present invention provides a modification of the refresh pulse method described in the aforementioned 2005/0270261 which can give a similar improvement in the appearance of a bistable electro-optic display while, at least in some cases, reducing the DC imbalance introduced.

The present invention also seeks to reduce or eliminate another problem encountered in bistable electro-optic displays which is not discussed in the aforementioned 2005/0270261, namely the so-called "edge ghosting" problem. Electro-optic displays typically have a backplane provided with a plurality of pixel electrodes each of which defines one pixel of the display; conventionally, a single common electrode extending over a large number of pixels, and normally the whole display is provided on the opposed side of the electro-optic medium. The individual pixel electrodes may be driven directly (i.e., a separate conductor may be provided to each pixel electrode) or the pixel electrodes may be driven in an active matrix manner which will be familiar to the those skilled in backplane technology. Since adjacent pixel electrodes will often be at different voltages, they must be separated by inter-pixel gaps of finite width in order to avoid electrical shorting between electrodes. Although at first glance it might appear that the electro-optic medium overlying these gaps would not switch when drive voltages are applied to the pixel electrodes (and indeed, this is often the case with some non-bistable electro-optic media, such as liquid crystals, where a black mask is typically provided to hide these non-switching gaps), in the case of many bistable electro-optic media the medium overlying the gap does switch because of a phenomenon known as "blooming".

Blooming refers to the tendency for application of a drive voltage to a pixel electrode to cause a change in the optical state of the electro-optic medium over an area larger than the physical size of the pixel electrode. Although excessive blooming should be avoided (for example, in a high resolution active matrix display one does not wish application of a drive voltage to a single pixel to cause switching over an area covering several adjacent pixels, since this would reduce the effective resolution of the display) a controlled amount of blooming is often useful. For example, consider a black-on-white electro-optic display which displays numbers using a conventional seven-segment array of seven directly driven pixel electrodes for each digit. When, for example, a zero is displayed, six segments are turned black. In the absence of blooming, the six inter-pixel gaps will be visible. However, by providing a controlled amount of blooming, for example as described in the aforementioned 2005/0062714, the inter-pixel gaps can be made to turn black, resulting in a more visually pleasing digit. However, blooming can lead to a problem denoted "edge ghosting".

Consider the common situation of a layer of electro-optic medium disposed between a continuous front electrode and an array of pixel electrodes arranged on a backplane. When a pixel electrode is held at a voltage different from that of the front electrode, an electric field exists in the electro-optic medium. This electric field is primarily directed perpendicular to the layer of electro-optic medium and is of approximately uniform intensity (ignoring for present purposes the distorting effects of space charges and polarization of the electro-optic medium itself). However, near the edge of the pixel, fringe fields form, and these fringe fields extend into the interpixel-regions between the pixel subjected to the electric field and the adjacent pixels. In the fringe field region, the electric field lines are curved, going from the pixel to the top plane or the neighboring electrodes. The electric field in this region is generally weaker than in the central part of the pixel.

Waveforms are typically designed to achieve correct transitions to desired optical states in central parts of pixels, i.e., far from pixel edges, and thus away from the fringe fields. For example, consider an array of pixels in one extreme optical state (say black), and a situation where one pixel is driven to the opposed extreme optical state (white) by applying to that pixel a drive voltage for a drive period, then the pixel is driven back to black by applying an opposite voltage for the same drive period. The voltages and drive periods are chosen to achieve the appropriate black state in the central part of the pixel after this pair of transitions. However, in the fringe field region, the electric field during the transitions is weaker than in the central part of the driven pixel. Therefore, in this fringe field region, the first voltage pulse does not drive the electro-optic medium from black to white, but instead from black to an intermediate gray. Also in the fringe field region, the second voltage pulse drives the electro-optic medium from this intermediate gray towards black. However, as discussed in several of the related applications mentioned above, the response of many electro-optic media to electric fields is not necessarily linear with the magnitude of the applied field, nor is it necessarily symmetric with respect to the direction of the electric field. Consequently, after the two transitions previously discussed, the inter-pixel region does not necessarily return to exactly its original black state. Generally, the optical state of the fringe field region will be slightly less black than the original state, i.e., it will be a very dark gray rather than a true black, thus leaving the fringe field region lighter in color than the black central part of the pixel. This is referred to as an edge ghost, which is one class of edge artifact. Such edge ghosts, if sufficiently large, are readily detected by the human eye and highly objectionable.

(The foregoing discussion is simplified for purposes of illustration. An area of blooming is not a uniform white or black but is typically a transition zone where, as one moves across the area of blooming, the color of the medium transitions from white through various shades of gray to black. Accordingly, an edge ghost will typically be an area of varying shades of gray rather than a uniform gray area, but can still be visible and objectionable, especially since the human eye is well equipped to detect areas of gray in monochrome images where each pixel is supposed to be pure black or pure white.)

In some cases, asymmetric blooming may contribute to edge ghosting. "Asymmetric blooming" refers to a phenomenon whereby in some electro-optic media (for example, the copper chromite/titania encapsulated electrophoretic media described in the aforementioned U.S. Pat. No. 7,002,728) the blooming is "asymmetric" in the sense that more blooming occurs during a transition from one extreme optical state of a pixel to the other extreme optical state than during a transition in the reverse direction; in the media described in this patent, typically the blooming during a black-to-white transition is greater than that during a white-to-black one.

The present invention provides methods for driving bistable electro-optic displays which can reduce or eliminate edge ghosting.

Another problem associated with blooming is that one pixel may in effect control an area of the display which is intended to be controlled by an adjacent pixel. Ideally, one might desire that blooming be controlled so that the fringe field from one pixel causes a change in optical state extending half-way across gap between it and an adjacent pixel. In practice, however, blooming varies with numerous factors, including particularly the temperature of the electro-optic medium, so that it may not always be possible to control the blooming to the optimum value. Furthermore, as already noted, because of fringe fields varying with distance, an area of blooming does not have a sharp edge between the two extreme optical states, but rather an area of finite width where a transition between the two optical states occurs. Accordingly, if one wishes to ensure that, for example, the white area of a white pixel extends half-way across the inter-pixel gap (so that when the two adjacent pixels are both driven white, the inter-pixel gap is the same white color as the pixels themselves), it may be necessary to tolerate a gray area extending more than half-way across the inter-pixel gap when one pixel is driven white while the other is still black. However, the presence of such a gray area may be problematic in some circumstances. For example, if the display is a color display provided with a color filter array, and the two pixels involved underlie different colored areas of the color filter array, the presence of the gray area when the first pixel is white and the second black may result in "contamination" of the color of the first pixel with some amount of the color of the second, thus adversely affecting the color rendering of the display

SUMMARY OF THE INVENTION

The present invention may be regarded as comprising various modifications of the refresh pulse driving method of the aforementioned 2005/0270261. In the present method, "refresh" pulses are not generated at arbitrary intervals but are keyed to transitions occurring at other pixels. Furthermore, in the present method, the refresh pulses may not be applied to all pixels or all pixels having a given optical state, but may be confined to certain pixels adjacent a pixel undergoing a transition. For convenience, the corrective pulses applied in accordance with the method of the present invention will be referred to as "reinforcing pulses" while the term "refresh pulses" will be used to denote pulses applied in the method of the aforementioned 2005/0270261.

Accordingly, this invention provides a first method of driving a bistable electro-optic display having at least first and second pixels each of which can display first and second extreme optical states (the pixels may or may not have other intermediate optical states), the first and second pixels having adjacent edges separated by an inter-pixel gap. The first method comprises applying to the first pixel a drive pulse effective to cause the first pixel to change its optical state to one of its extreme optical states, and applying to the second pixel, which is in the said one extreme optical state, a reinforcing pulse of the same polarity as the drive pulse, the reinforcing pulse being applied either simultaneously with the drive pulse or within a predetermined period after the end of the drive pulse.

This first method of the present invention (which may hereinafter be referred to as the "reinforcing pulse method") may be applied to a monochrome display in which each pixel is intended to display only first and second (typically white and black) optical states. In such monochrome displays, when the first pixel is undergoing a transition from its first to its second optical state (say from white to black), while the second pixel is in its second optical state (black) and is to remain in this second optical state, the first pixel is given a pulse of one polarity to effect the desired transition. During this pulse, or shortly thereafter, the second pixel is given a reinforcing pulse of the same polarity as the drive pulse given to the first pixel (i.e., a black-going pulse). Since the second pixel is already black, the reinforcing pulse does not effect a gross change in the black color of the second pixel. However, if the second pixel has been in its black state for some time, so that its color has "drifted" from a true black to a dark gray, the reinforcing pulse serves to drive the second pixel back to a true black, thus avoiding having a dark gray second pixel immediately adjacent a true black first pixel, a situation which is readily apparent to the human eye. The reinforcing pulse also serves to reduce or eliminate edge ghosting in the inter-pixel gap between the first and second pixels.

As discussed in the various applications and patents mentioned in the "Reference to Related Applications" section above, waveforms used to drive pixels of electro-optic displays from one optical state to another may be quite complex and may include drive pulses of both polarities. Thus, the "drive pulse" applied to the first pixel in the reinforcing pulse method of the present invention may in fact be a complex waveform including multiple individual drive pulses some of which may have opposing polarities. For present purposes, the polarity of such a complex waveform may be defined as the polarity of a single drive pulse of constant magnitude which effects the same optical transition of the first pixel as the complex waveform.

The "reinforcing pulse" used in the present method may itself comprise more than a single pulse. In particular, there are two principal variants of the present reinforcing pulse method, which may be termed the single and double reinforcing pulse variants. As its name implies, the single reinforcing pulse method uses only one reinforcing pulse. The double reinforcing pulse method is more complex. Consider the situation discussed above where a display has first and second pixels sharing a common edge, with the first pixel undergoing a transition from white to black, while the second pixel remains in its black state. If a single reinforcing method is being used, there is applied to the second pixel a single pulse of the same polarity as the pulse applied to the first pixel, i.e., a black-going pulse. In the double reinforcing pulse method, there is first applied to the second pixel a pulse of the opposite polarity to that applied to the first pixel (i.e., a white-going pulse), and thereafter there is applied to the second pixel a pulse of the same polarity as that applied to the first pixel (i.e., a black-going pulse). The two successive pulses applied to the second pixel may hereinafter be referred to a the "reverse reinforcing pulse" and the "forward reinforcing pulse" respectively. There may or may not be a pause (a period of zero voltage) between the reverse and forward reinforcing pulses. As discussed in more detail below, it has been found that the double reinforcing pulse method typically more accurately matches the color of the second pixel to that of the first pixel.

As already noted, in the present method the reinforcing pulse may be applied only to a pixel that shares an edge with the pixel being driven (hereinafter for convenience pixels having this relationship may be called "edge-adjacent pixels" to distinguish them from "corner-adjacent pixels" which only have one corner in common). There are three main variants of the present method, all of which may be applied to the typical type of display comprising a two dimensional array of pixels arranged in rows and columns:

(a) An "edge-adjacent-only" variant, in which the reinforcing pulse is applied only to the edge-adjacent neighbors of each pixel being driven from one optical state to another; in the common case where the pixels of a display are arranged in a rectangular matrix, most pixels will of course have four edge-adjacent neighbors. It has not been found necessary to apply the reinforcing pulse to pixels corner-adjacent to the driven pixels, although this could of course be done if so desired;

(b) A "global" variant in which, when one or more pixels are driven to one extreme optical state, the reinforcing pulse is applied to all pixels already in that one extreme optical state; and (c) An intermediate "contiguous area" variant in which, when one or more pixels in a contiguous area are driven to one extreme optical state, the reinforcing pulse is applied to all pixels within that contiguous area already in that one extreme optical state, but the reinforcing pulse is not applied to pixels in that one extreme optical state outside the contiguous area.

Variant (c) may require further explanation. Consider the not-uncommon situation of a series of images in which a single object, or small number of objects, are moving against an essentially static background; more specifically, consider a series of monochrome images in which a black plane is moving against a white sky. To effect a transition between successive images, certain pixels around the periphery of the plane must be rewritten. To avoid visually-distracting effects, it may be desirable to apply the reinforcing pulses to black pixels representing the plane, but not to black pixels representing the ground beneath. Similarly, if a display is configured as a series of essentially independent windows, it may be desirable to use a drive scheme in which a "global" updating method is applied to each window independently.

As already mentioned, in the reinforcing pulse method the reinforcing pulse is applied either simultaneously with the drive pulse or within a predetermined period after the end of the drive pulse. It is desirable that the reinforcing pulse appear to a user of the display to be part of the same transition as that of the driven pixel, rather than there appearing to be a first transition for the driven pixel and a second one for the reinforcing pulse. Typically, the reinforcing pulse should be applied either simultaneously with the drive pulse or within a subsequent period equal to the length of the drive pulse, and preferably not exceeding about 400 milliseconds. In most cases, it is conveniently to effect the reinforcing pulse simultaneously with the last part of the drive pulse (i.e., simultaneously with a terminal portion of the drive pulse).

The impulse applied by the reinforcing pulse may vary over a wide range, depending, of course, upon the specific electro-optic medium employed and other parameters of a specific display. In some cases, the reinforcing pulse may have the same impulse as the drive pulse (assuming that the drive pulse is that needed to drive the first pixel from its first to its second extreme optical state) but usually the impulse of the reinforcing pulse will be smaller. Typically, the impulse of the reinforcing pulse may be from about 10 to about 70, more usually from about 20 to about 50, percent of the impulse of the drive pulse. It appears that in many cases a reinforcing pulse having an impulse of about 25 percent of the impulse of the drive pulse gives good results. Even in the so-called single reinforcing pulse variant of the present method, the reinforcing pulse need not have the form of a single continuous pulse but may be in form of a plurality of discrete sub-pulses separated by one or more pauses (i.e., periods of zero applied voltage); for example, if the reinforcing pulse is to have a impulse of 20 percent of the impulse of the drive pulse, the reinforcing pulse could be in the form of two discrete sub-pulses each having an impulse of 10 percent of the drive pulse impulse, with one sub-pulse being applied simultaneously with the last part of the drive pulse and the second (say) 100 milliseconds after the end of the drive pulse, with a period of zero voltage between the two sub-pulses. The voltage of the reinforcing pulse may be the same or different from that of the drive pulse; in some cases, it appears that it may be advantageous for the reinforcing pulse to be of a lower voltage than the drive pulse.

The present invention extends to a bistable electro-optic display, controller or application specific integrated circuit arranged to carry out the reinforcing pulse method of the present invention. Specifically, the invention extends to an electro-optic display comprising a layer of bistable electro-optic medium which can display first and second extreme optical states, first and second pixel electrodes disposed adjacent the layer of bistable electro-optic medium and capable of applying electric fields to the medium, the first and second pixel electrodes having adjacent edges separated by an inter-pixel gap, and a controller for controlling the voltages applied to the first and second pixel electrodes, wherein the controller is arranged to carry out a drive method comprising:

applying to the first pixel electrode a drive pulse effective to cause the electro-optic medium adjacent the first pixel electrode to change its optical state to one of its extreme optical states, and applying to the second pixel electrode, while the electro-optic medium adjacent the second pixel electrode is in the said one extreme optical state, a reinforcing pulse of the same polarity as the drive pulse, the reinforcing pulse being applied either simultaneously with the drive pulse or within a predetermined period after the end of the drive pulse.

The present invention also provides a second drive method, which may hereinafter be referred to as the "inverse reinforcing pulse method" of the present invention. Unlike the first (reinforcing pulse) method described above, which is applied when one of an edge-adjacent pair of pixels is transitioning to one optical state while the other of the pair is remaining in that optical state, the inverse reinforcing pulse method of the present invention is applied where one of an edge-adjacent pair of pixels is transitioning from one optical state while the other of the pair is remaining in that optical state. For example, the inverse reinforcing pulse method may be applied where a first pixel is transitioning from white to black, while an adjacent pixel is staying white. In the inverse reinforcing pulse method, the non-transitioning pixel is given a pulse of the opposite polarity to that applied to the transitioning pixel, i.e., in the foregoing example, the adjacent pixel would be given a white-going pulse.

Accordingly, the present invention provides a method of driving a bistable electro-optic display having at least first and second pixels each of which can display first and second extreme optical states (the pixels may or may not have other intermediate optical states), the first and second pixels having adjacent edges separated by an inter-pixel gap. The present inverse reinforcing pulse method comprises applying to the first pixel a drive pulse effective to cause the first pixel to change its optical state from one of its extreme optical states, and applying to the second pixel, which is in the said one extreme optical state, an inverse reinforcing pulse of the opposite polarity to the drive pulse, the inverse reinforcing pulse being applied either simultaneously with the drive pulse or within a predetermined period after the end of the drive pulse.

The inverse reinforcing pulse method of the present invention can make use of any of the variants of the main reinforcing pulse method already described; thus, for example, the inverse reinforcing method may be applied on an edge-adjacent, contiguous area or global basis, although typically it will be applied on an edge-adjacent basis. The inverse reinforcing pulse method may also comprise more than one pulse, and in particular may comprise two pulses of opposite polarity as described for the first method of the present invention.

The inverse reinforcing pulse method of the present invention is intended to reduce to eliminate the problems caused by excessive blooming as described above. In the situation already mentioned where the first of a pair of adjacent white pixels is transitioning from white to black while the second pixel is remaining white, there is a tendency for the drive pulse applied to the first pixel to cause the resultant black area to extend more than half-way across the inter-pixel gap, causing the problems noted above. By applying an inverse reinforcing (white-going) pulse to the second pixel, the excessive black blooming is reduced or eliminated.

The present invention extends to a bistable electro-optic display, display controller or application specific integrated circuit (ASIC) arranged to carry out the second method of the invention. Specifically, the invention extends to an electro-optic display comprising a layer of bistable electro-optic medium which can display first and second extreme optical states, first and second pixel electrodes disposed adjacent the layer of bistable electro-optic medium and capable of applying electric fields to the medium, the first and second pixel electrodes having adjacent edges separated by an inter-pixel gap, and a controller for controlling the voltages applied to the first and second pixel electrodes, wherein the controller is arranged to carry out a drive method comprising:

applying to the first pixel a drive pulse effective to cause the first pixel to change its optical state from one of its extreme optical states, and applying to the second pixel, which is in the said one extreme optical state, an inverse reinforcing pulse of the opposite polarity to the drive pulse, the inverse reinforcing pulse being applied either simultaneously with the drive pulse or within a predetermined period after the end of the drive pulse.

The displays of the present invention may make use of any of the types of bistable electro-optic media described above. Thus, for example, the displays of the present invention may comprise a rotating bichromal member or electrochromic medium. Alternatively, the displays may comprise an electrophoretic medium comprising a plurality of electrically charged particles disposed in a fluid and capable of moving through the fluid under the influence of an electric field. The electrically charged particles and the fluid may be confined within a plurality of capsules or microcells. Alternatively, the electrically charged particles and the fluid may be present as a plurality of discrete droplets surrounded by a continuous phase comprising a polymeric material, so that the electrophoretic medium is of the polymer-dispersed type. The fluid may be liquid or gaseous.

The displays of the present invention may be used in any application in which prior art electro-optic displays have been used. Thus, for example, the present displays may be used in electronic book readers, portable computers, tablet computers, cellular telephones, smart cards, signs, watches, shelf labels and flash drives.

BRIEF DESCRIPTION OF THE DRAWINGS

FIG. 1 of the accompanying drawings is a graph showing the variation with time of the reflectivities of two pixels during the refresh pulse method of the aforementioned 2005/0270261.

FIG. 2 is a graph similar to FIG. 1 but showing the reflectivities of two pixels during a first, reinforcing pulse, method of the present invention.

DETAILED DESCRIPTION

Figure 3:
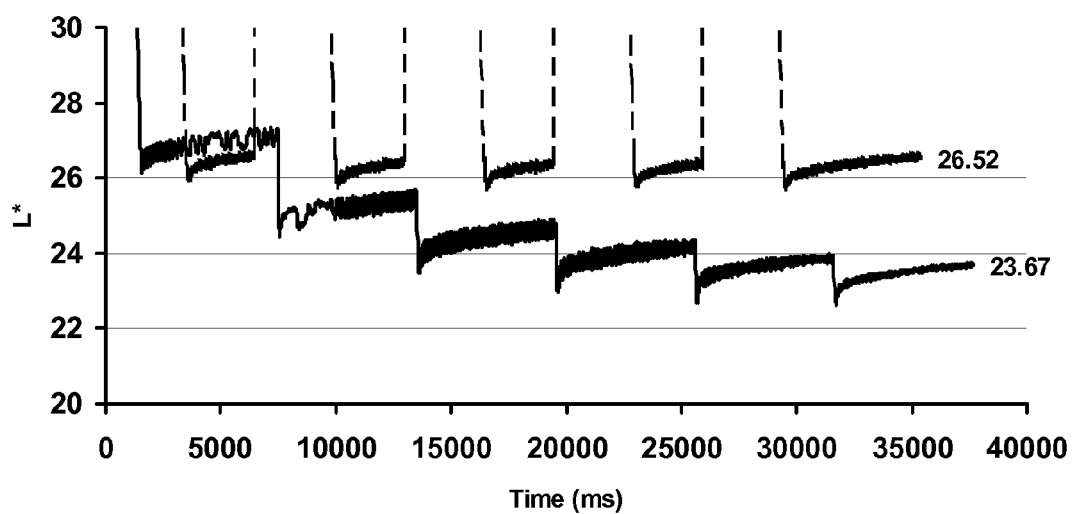
FIG. 3 is a graph showing the variation with time of the reflectivities of a "flashing" pixel which is repeatedly cycled between its black and white extreme optical states, and of a second pixel which is subjected to a single reinforcing pulse method of the present invention.

As already indicated, a first aspect of this invention relates to a method of driving a bistable electro-optic display in which a reinforcing pulse, which does not effect a gross change in the optical state of a pixel, is applied to one or more pixels during or shortly after the application to another pixel of a drive pulse which does change the optical state of that pixel. The reinforcing pulse serves to match the color of the pixel receiving the reinforcing pulse to that of the pixel receiving the drive pulse and, if the two pixels are edge-adjacent, reduces edge ghosting between the two pixels.

As compared with the refresh pulse driving method of the aforementioned 2005/0270261, the present method may reduce the number of reinforcing pulses needed, since if the display is not updated for a long period, no reinforcing pulses will be applied. (It is of course possible to combine the present methods with the refresh pulse method by ensuring that, if any pixel does not receive a drive pulse or a reinforcing pulse for a long period, that pixel will receive a refresh pulse at the end of the long period.) Also, the reinforcing pulses need not be applied to every pixel of a display in a given extreme optical state, which further reduces the number of reinforcing pulses needed. Accordingly, the present invention can reduce the amount of DC imbalance in a refresh pulse driving method while still avoiding undesirable visual artifacts.

The DC imbalance introduced by the present reinforcing pulse method may be compensated in a manner similar to that described in the aforementioned 2005/0270261; the display controller may keep track of the DC imbalance of each pixel and adjust the impulse of a drive pulse or waveform used to drive the pixel from one extreme optical state to the other to compensate for accumulated DC imbalance of the pixel. If the drive scheme employed makes use of blanking pulses (i.e., pulses which drive all pixels of the display, or of a particular area thereof, to the same optical state) DC balancing is conveniently effected during application of the blanking pulse.

FIG. 1 of the accompanying drawings is a graph of the optical states of two pixels of a monochrome bistable electro-optic display plotted against time. As shown in FIG. 1, both pixels (designated Pixel 1 and Pixel 2) are originally in their dark extreme optical state. Pixel 2 receives a drive pulse which drives it to its white optical state (represented near the upper end of reflectivity (R) ordinate in FIG. 1). Thereafter, this white state slowly decays, as indicated by the gradual downward slope of the Pixel 2 curve in FIG. 1. Although not shown in FIG. 1, a pixel driven to its black optical state will also decay in an analogous manner, so that after some time a black-and-white image written on the display becomes a dark gray and light gray image, with reduced contrast ratio. (The extent of the decay is exaggerated in FIG. 1 for ease of illustration.) The human eye is very tolerant of such slow, uniform changes in images, and in practice if no part of the image needs to be changed, an image on a bistable display can be left for a substantial period (often of the order of hours, depending upon the specific electro-optic medium employed) before the reduced contrast ratio becomes objectionable to most observers.

However, if, some time after Pixel 2 has been driven to its white state, Pixel 1, (assumed for present purposes to be edge-adjacent to Pixel 2) is driven to its white state, there is a significant difference between the white, freshly rewritten Pixel 1 and the partially-decayed, light gray Pixel 2, as shown by the vertical spacing between the two curves in FIG. 1, which also shows that this difference will persist for some time as the optical states of both pixels gradually decay. The resultant difference in color between adjacent pixels tends to be very obvious to the human eye, depending of course upon the extent of the decay in white state. An exactly analogous situation occurs if Pixel 1 and Pixel 2 are driven to their black optical states at different times.

FIG. 2 shows the same sequence of events as FIG. 1 but with the addition of a reinforcing pulse in accordance with the present invention. As will be seen from FIG. 2, a reinforcing pulse is applied to Pixel 2 at essentially the same time as Pixel 1 is driven to its white state, so that after the reinforcing pulse, both Pixel 1 and Pixel 2 are in the same freshly rewritten white state. Thereafter, the white states of Pixels 1 and 2 decay together, so Pixels 1 and 2 maintain the same color at all later times shown in FIG. 2. As already noted, the reinforcing pulse also helps to reduce or eliminate edge ghosting effects between the edge-adjacent Pixels 1 and 2.

In practice, as is the way of the world, matters are not as simple as illustrated in the somewhat idealized graph of FIG. 2. As mentioned in some of the applications referred to in the "Reference to Related Applications" section above, the extreme optical states of many electro-optic media are not absolutely fixed, and there is a so-called "soft rail" phenomenon such that when one attempts to drive the medium to its extreme optical state the exact optical state achieved depends upon a number of factors including the length of the drive pulse applied, the previous optical states of the pixel and the periods during which the pixel has remained in those optical states. It has been found that repeated application of single reinforcing pulses to a single pixel can pause the pixel to drift towards a more extreme optical state than can be achieved when a pixel is cycled between its two extreme optical states. This is not an unlikely scenario in practice; and would for example, occur in an unchanging pixel adjacent a pixel which is being flashed at regular intervals, for example as part of a timekeeping device.

This situation is illustrated in FIG. 3 of the accompanying drawings, which shows data generated from experimental single pixel displays using encapsulated titania/copper chromite based electrophoretic media substantially as described in Example 4 of the aforementioned U.S. Pat. No. 7,002,728. The broken line in FIG. 3 shows the L* values obtained from a pixel which was repeatedly cycled between its black and white extreme optical states using ±10 V, 240 millisecond drive pulses with 3 seconds between each drive pulse, then finally allowed to rest for 6 seconds (because of the scale of the ordinate in FIG. 3, only the portion of the trace of this pixel adjacent the black extreme optical state is visible, and the apparent broadening of the trace during the rest periods is due to detector noise). It will be seen from FIG. 3 that (after a minor variation in the first cycle) the behavior of this pixel is consistent in all cycles, with a final L* value of 26.52.

The solid line in FIG. 3 shows the trace obtained from a second pixel which is initially driven to its black extreme optical state using a 10 V 240 millisecond pulse in the same way as the first pixel, and is thereafter subjected to 10 V 40 millisecond reinforcing pulses at 6 second intervals, thus mimicking the pulses applied to a pixel adjacent to the flashing pixel and subjected to a single reinforcing pulse method of the present invention. It will be seen from FIG. 3 that the reinforcing pulses gradually drive the second pixel to darker optical states, so that after five reinforcing pulses and the final 6 second rest period the pixel has an L* value of 23.67. The difference of almost 3 units between the final L* values of the two pixels is readily perceived by the human eye, and would result in an objectionable ghost, i.e., the pixel which has been flashing would appear as dark gray next to the black unchanging pixel, thus leaving a pale "ghost" of the white flashed image when both pixels were supposed to be in the same final black state.

Figure 4:
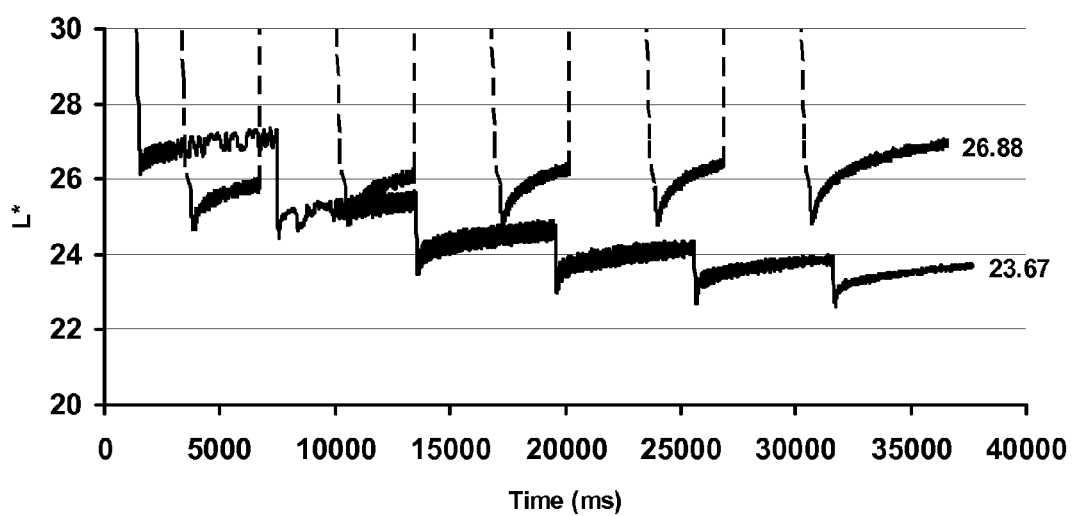
FIG. 4 is a graph similar to FIG. 3 but showing the effect of driving the flashing pixel with longer drive pulses.

At first glance, it might appear that this ghosting problem could be overcome simply by increasing the length of the drive pulse applied to the first, flashing pixel, but empirically this has been found not to be the case. FIG. 4 of the accompanying drawings shows traces similar to those of FIG. 3, except that the flashing pixel was driven with 480 millisecond drive pulses. It will be seen from FIG. 4 that, although the longer drive pulses do initially drive the flashing pixel to lower L* values than the shorter drive pulses used in FIG. 3, they also cause a considerably greater change in L* values in the 1-2 seconds following the drive pulse (the phenomenon referred to as "self-erasing" or "kickback" in some of the aforementioned E Ink patents and applications) so that the final state of the flashing pixel in FIG. 4 does not differ greatly from that in FIG. 3, and indeed the final L* value of the flashing pixel in FIG. 4 is slightly greater than in FIG. 3, i.e., the flashing pixel actually ends up slightly lighter in color. As in FIG. 3, the difference between the final states of the two pixels in FIG. 4 would readily be perceptible to the human eye and would result in an undesirable ghost image.

Figure 5:
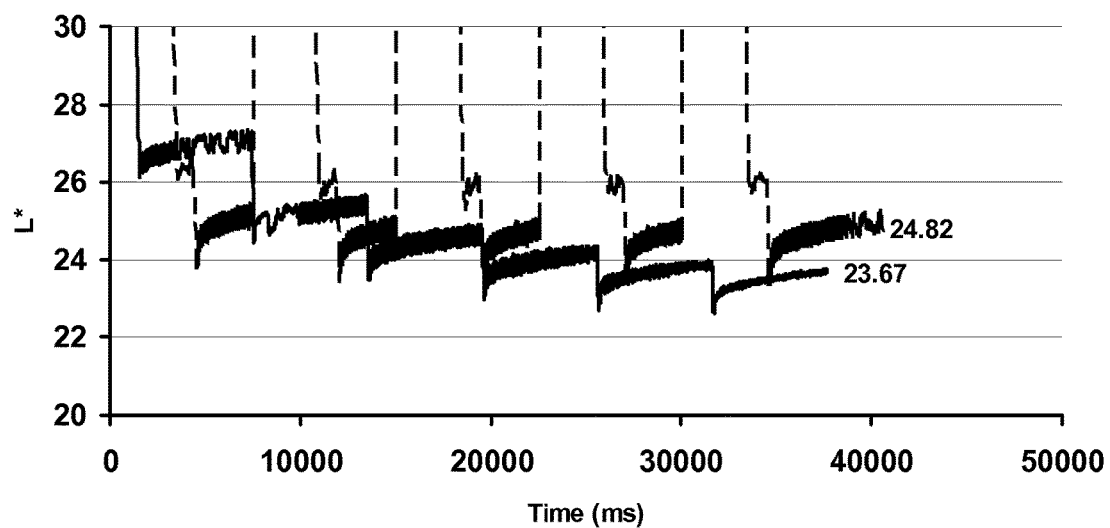
FIG. 5 is a graph similar to those of FIGS. 3 and 4 but showing the effect of using a modified waveform for the flashing pixel.

Another attempt was made to eliminate the difference between the final states of the two pixels by using for the first, flashing pixel a drive waveform comprising a 240 millisecond drive pulse, a 1 second pause when no voltage was applied, and then a 40 millisecond second drive pulse, both drive pulses being at 10 V; in effect, these experiments applied the 40 millisecond reinforcing pulse to both the flashing and the unchanging pixel. The traces obtained are shown in FIG. 5 of the accompanying drawings. From this Figure it will be seen that the difference between the final states of the two pixels was substantially reduced; the approximately 1 L* unit difference which remained would not be readily apparent to most observers. However, the 1 second pause between the two drive pulses applied to the flashing pixel produced an undesirable "flashy" effect; an observer viewing the two pixels would in effect see an initial ghost image which would disappear one second later.

Figure 6:
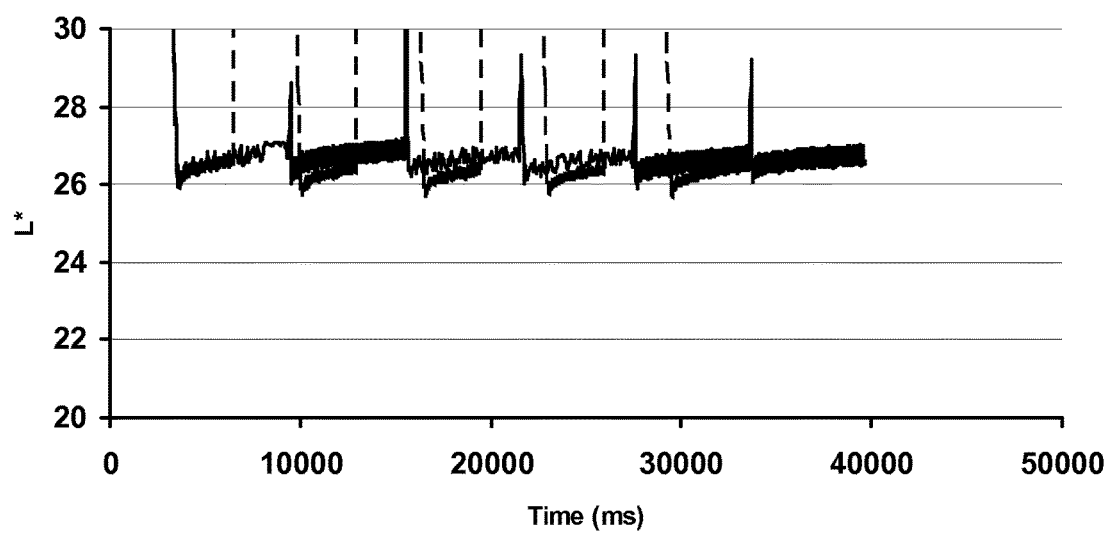
FIG. 6 is a graph similar to those of FIGS. 3 to 5 but showing the effect of using a double reinforcing pulse method of the present invention on the second pixel.

Finally, FIG. 6 shows traces similar to those of FIGS. 3 to 5 but in which the unchanging pixel was driven in accordance with a double reinforcing pulse method of the present invention, there being applied to this unchanging pixel a −10 V, 15 millisecond (white-going) reverse reinforcing pulse, immediately followed by a +10 V, 25 millisecond (black-going) forward reinforcing pulse. It will be seen from FIG. 6 that this double reinforcing pulse method essentially eliminated the difference between the final optical states of the two pixels; the actual values were 26.61 for the flashing pixel and 26.52 for the unchanging pixel, and the difference of 0.09 L* units is unlikely to be noticed even by expert observers. Although the double reinforcing pulse does produce a slight flash as the nominally unchanging pixel first goes slightly whiter and then slightly darker, this slight flash is much less objectionable than the flash produced in FIG. 5, where the two transitions are one second apart. Furthermore, the slight flash experienced in the FIG. 6 drive scheme can be minimized by careful choice of when the reinforcing pulses are applied relative to the drive pulse applied to the flashing pixel; the eye will be less sensitive to the slight flash of the unchanging pixel is this is timed to coincide with the last part of the much more noticeable white-to-black transition of the flashing pixel.

The double reinforcing pulse method of FIG. 6 not only produces more accurate matching of the final states of the flashing and unchanging pixels than the single reinforcing pulse method of FIG. 3 but also reduces the amount of DC imbalance introduced by the reinforcing pulses by a factor of 4; the algebraic sum of the forward and reverse reinforcing pulses in the FIG. 6 method is a 10 V, 10 millisecond pulse, as compared with the 10 V, 40 millisecond pulse used in the FIG. 3 method.

The optimum lengths of the reverse and forward reinforcing pulses in the double reinforcing pulse method of the present invention are dependent upon several factors, including the specific electro-optic medium employed, its temperature and the conductivity of the lamination adhesive which is normally present between the electro-optic medium and one of the electrodes, as in the displays used in the experiments shown in FIGS. 3 to 6. In general, the higher the conductivity of the lamination adhesive, the shorter can be the reinforcing pulse lengths and the less flash is perceived from these pulses. However, high conductivity lamination adhesives do increase blooming. Consequently, it may be more difficult to apply the methods of the present invention in displays using low conductivity lamination adhesives, such as those typically used in high resolution active matrix displays, without causing a possibly objectionable degree of flashiness in the display. It should also be noted that the reinforcing pulse lengths are not necessarily the same for the black and white states. For example, the 15/25 millisecond combination used in FIG. 6 was found to be optimal for transitions to the black extreme optical state of the medium. However, when similar experiments were conducted for transitions to the white extreme optical state of the same medium at the same temperature, it was found that a 20/25 millisecond combination gave optimal results.

Both the reinforcing pulse method and the inverse reinforcing pulse method of the present invention can be used in the same display at the same time. However, because pixels have multiple edge-adjacent neighbors (for example, in a typical rectangular matrix display most pixels have four edge-adjacent neighbors), the demands of the two methods may conflict and it is necessary to devise rules to enable the two methods to co-exist. For example, a single unchanging black pixel may have one edge-adjacent neighbor which is changing from black to white (suggesting the use of an inverse reinforcing pulse method) and another neighbor which is changing from white to black (suggesting the use of a "regular" reinforcing pulse method) and the optimum reinforcing pulse lengths may not be the same in the two cases. In general, artifacts due to mismatches between the optical states of entire pixels are more objectionable than artifacts due to mismatches within the inter-pixel region. Accordingly, where the demands of the reinforcing pulse method are in conflict with those of the inverse reinforcing pulse method, in general the demands of the former should prevail.

Numerous changes and modifications can be made in the preferred embodiments of the present invention already described without departing from the scope of the invention. Accordingly, the foregoing description is to be construed in an illustrative and not in a limitative sense.

The invention claimed is:

1. A method of driving a bistable electrophoretic display, the display comprising an electrophoretic medium comprising a plurality of electrically charged particles disposed in a fluid and capable of moving through the fluid under the influence of an electric field, the display having at least first and second pixels each of which can display first and second extreme optical states, the first and second pixels having adjacent edges separated by an inter-pixel gap, the method comprising:

applying to the first pixel a drive pulse effective to cause the first pixel to change its optical state to one of its extreme optical states, and applying to the second pixel, which is in the said one extreme optical state, a reinforcing pulse, the overall impulse of which has the same polarity as the drive pulse, the reinforcing pulse being applied either simultaneously with the drive pulse or within a period after the end of the drive pulse equal to the length of the drive pulse;

wherein the display comprises a two dimensional array of pixels, and the reinforcing pulse is applied only to pixels which are in the said one extreme optical state and share a common edge with the pixel to which the drive pulse is applied.

2. A method according to claim 1 wherein the display is a monochrome display in which each pixel displays only first and second optical states.

3. A method according to claim 1 wherein the reinforcing pulse comprises only a single pulse of same polarity as the drive pulse.

4. A method according to claim 1 wherein the reinforcing pulse comprises a first pulse of opposite polarity to the drive pulse and a second pulse of the same polarity as the drive pulse and of larger impulse than the first pulse.

5. A method according to claim 1 wherein the display comprises a two dimensional array of pixels, and wherein, when one or more pixels in a contiguous area are driven to one extreme optical state, the reinforcing pulse is applied to all pixels within that contiguous area already in that one extreme optical state, but the reinforcing pulse is not applied to pixels in that one extreme optical state outside the contiguous area.

6. A method according to claim 1 wherein the subsequent period has a duration not exceeding about 400 milliseconds.

7. A method according to claim 1 wherein the reinforcing pulse is applied simultaneously with a terminal portion of the drive pulse.

8. A method according to claim 1 wherein the reinforcing pulse has an impulse of from about 10 to about 70 percent of the impulse of the drive pulse.

9. A method according to claim 8 wherein the reinforcing pulse has an impulse of from about 20 to about 50 percent of the impulse of the drive pulse.

10. A method according to claim 9 wherein the reinforcing pulse has an impulse of about 25 percent of the impulse of the drive pulse.

11. A method according to claim 1 wherein the reinforcing pulse comprises a plurality of discrete sub-pulses separated by at least one period of zero voltage.

12. A method according to claim 1 wherein the reinforcing pulse has a lower voltage than the drive pulse.

13. A method according to claim 1 wherein the electrically charged particles and the fluid are confined within a plurality of capsules or microcells.

14. A method according to claim 1 wherein the electrically charged particles and the fluid are present as a plurality of discrete droplets surrounded by a continuous phase comprising a polymeric material.

15. A method according to claim 1 wherein the fluid is gaseous.

16. A bistable electro-optic display, display controller or application specific integrate circuit arranged to carry out the method of claim 1.

17. An electrophoretic display comprising a layer of bistable electrophoretic medium which can display first and second extreme optical states, the medium comprising a plurality of electrically charged particles disposed in a fluid and capable of moving through the fluid under the influence of an electric field, the display having first and second pixel electrodes disposed adjacent the layer of bistable medium and capable of applying electric fields to the medium, the first and second pixel electrodes having adjacent edges separated by an inter-pixel gap, and a controller for controlling the voltages applied to the first and second pixel electrodes, wherein the controller is arranged to carry out a drive method comprising:

applying to the first pixel electrode a drive pulse effective to cause the medium adjacent the first pixel electrode to change its optical state to one of its extreme optical states, and applying to the second pixel electrode, while the medium adjacent the second pixel electrode is in the said one extreme optical state, a reinforcing pulse, the overall impulse of which has the same polarity as the drive pulse, the reinforcing pulse being applied either simultaneously with the drive pulse or within a period after the end of the drive pulse equal to the length of the drive pulse;

wherein the display comprises a two dimensional array of pixels, and the reinforcing pulse is applied only to pixels which are in the said one extreme optical state and share a common edge with the pixel to which the drive pulse is applied.

18. An electronic book reader, portable computer, tablet computer, cellular telephone, smart card, sign, watch, shelf label or flash drive comprising a display according to claim 17.

19. A method of driving a bistable electrophoretic display, the display comprising an electrophoretic medium comprising a plurality of electrically charged particles disposed in a fluid and capable of moving through the fluid under the influence of an electric field, the display having at least first and second pixels each of which can display first and second extreme optical states, the first and second pixels having adjacent edges separated by an inter-pixel gap, the method comprising:

applying to the first pixel a drive pulse effective to cause the first pixel to change its optical state from one of its extreme optical states, and applying to the second pixel, which is in the said one extreme optical state, an inverse reinforcing pulse, the overall impulse of which has the opposite polarity to the drive pulse, the inverse reinforcing pulse being applied either simultaneously with the drive pulse or within a period after the end of the drive pulse equal to the length of the drive pulse;

wherein the display comprises a two dimensional array of pixels, and the reinforcing pulse is applied only to pixels which are in the said one extreme optical state and share a common edge with the pixel to which the drive pulse is applied.

20. A method according to claim 19 wherein the display is a monochrome display in which each pixel displays only first and second optical states.

21. A method according to claim 19 wherein the reinforcing pulse comprises only a single pulse of the opposite polarity from the drive pulse.

22. A method according to claim 19 wherein the reinforcing pulse comprises a first pulse of the same polarity as the drive pulse and a second pulse of the opposite polarity from the drive pulse and of larger impulse than the first pulse.

23. A method according to claim 19 wherein the display comprises a two dimensional array of pixels, and wherein, when one or more pixels in a contiguous area are driven from one extreme optical state, the reinforcing pulse is applied to all pixels within that contiguous area already in that one extreme optical state, but the reinforcing pulse is not applied to pixels in that one extreme optical state outside the contiguous area.

24. A method according to claim 19 wherein the subsequent period has a duration not exceeding about 400 milliseconds.

25. A method according to claim 19 wherein the reinforcing pulse is applied simultaneously with a terminal portion of the drive pulse.

26. A method according to claim 19 wherein the reinforcing pulse has an impulse of from about 10 to about 70 percent of the impulse of the drive pulse.

27. A method according to claim 26 wherein the reinforcing pulse has an impulse of from about 20 to about 50 percent of the impulse of the drive pulse.

28. A method according to claim 27 wherein the reinforcing pulse has an impulse of about 25 percent of the impulse of the drive pulse.

29. A method according to claim 19 wherein the reinforcing pulse comprises a plurality of discrete sub-pulses separated by at least one period of zero voltage.

30. A method according to claim 19 wherein the reinforcing pulse has a lower voltage than the drive pulse.

31. A method according to claim 19 wherein the electrically charged particles and the fluid are confined within a plurality of capsules or microcells.

32. A method according to claim 19 wherein the electrically charged particles and the fluid are present as a plurality of discrete droplets surrounded by a continuous phase comprising a polymeric material.

33. A method according to claim 19 wherein the fluid is gaseous.

34. A bistable electro-optic display, display controller or application specific integrate circuit arranged to carry out the method of claim 19.

35. An electrophoretic display comprising a layer of bistable electrophoretic medium which can display first and second extreme optical states, the medium comprising a plurality of electrically charged particles disposed in a fluid and capable of moving through the fluid under the influence of an electric field, the display having first and second pixel electrodes disposed adjacent the layer of bistable medium and capable of applying electric fields to the medium, the first and second pixel electrodes having adjacent edges separated by an inter-pixel gap, and a controller for controlling the voltages applied to the first and second pixel electrodes, wherein the controller is arranged to carry out a drive method comprising:

applying to the first pixel a drive pulse effective to cause the first pixel to change its optical state from one of its extreme optical states, and applying to the second pixel, which is in the said one extreme optical state, an inverse reinforcing pulse, the overall impulse of which has the opposite polarity to the drive pulse, the inverse reinforcing pulse being applied either simultaneously with the drive pulse or within a period after the end of the drive pulse equal to the length of the drive pulse;

wherein the display comprises a two dimensional array of pixels, and the reinforcing pulse is applied only to pixels which are in the said one extreme optical state and share a common edge with the pixel to which the drive pulse is applied.

36. An electronic book reader, portable computer, tablet computer, cellular telephone, smart card, sign, watch, shelf label or flash drive comprising a display according to claim 35.

* * * * *